US008694468B1

(12) United States Patent
Nagarkar et al.

(10) Patent No.: US 8,694,468 B1
(45) Date of Patent: Apr. 8, 2014

(54) SYSTEMS AND METHODS FOR PERFORMING BACKUPS

(75) Inventors: Kuldeep Nagarkar, Pune (IN); Dulipsinh Deshmukh, Pune (IN); Laxmikant Gunda, Pune (IN)

(73) Assignee: Symantec Corporation, Mountain View, CA (US)

( * ) Notice: Subject to any disclaimer, the term of this patent is extended or adjusted under 35 U.S.C. 154(b) by 188 days.

(21) Appl. No.: 12/796,829

(22) Filed: Jun. 9, 2010

(51) Int. Cl.
 *G06F 17/30* (2006.01)
(52) U.S. Cl.
 USPC .......................................... 707/640; 707/674
(58) Field of Classification Search
 USPC ................................................. 707/640, 674
 See application file for complete search history.

(56) References Cited

U.S. PATENT DOCUMENTS

| | | | |
|---|---|---|---|
| 2002/0083085 A1* | 6/2002 | Davis et al. | 707/204 |
| 2003/0191811 A1* | 10/2003 | Hashem et al. | 709/216 |
| 2004/0220980 A1* | 11/2004 | Forster | 707/204 |
| 2005/0283623 A1* | 12/2005 | Vanderheyden et al. | 713/193 |
| 2008/0133622 A1* | 6/2008 | Brown et al. | 707/204 |
| 2009/0249005 A1* | 10/2009 | Bender et al. | 711/162 |
| 2013/0018946 A1* | 1/2013 | Brown et al. | 709/203 |

OTHER PUBLICATIONS

Bob Spurzem; Mimosa Brings the Magic to Exchange; http://www.mimosasystems.com/blog/archiving/mimosa- brings-the-magic-to-exchange; taken from site on Apr. 27, 2010.
SnapManager for Microsoft Exchange; http://www.netapp.com/us/products/management-software/snapmanager-exchange.html; taken from site on Apr. 27, 2010.

* cited by examiner

*Primary Examiner* — Son T Hoang
(74) *Attorney, Agent, or Firm* — ALG Intellectual Property LLC

(57) ABSTRACT

A computer-implemented method for performing backups may include identifying a volume of data targeted for backup. The computer-implemented method may also include identifying at least one data object within the volume of data. The computer-implemented method may further include locating a copy of the data object within an archival data store. The computer-implemented method may additionally include backing up a reference to the copy of the data object within the archival data store instead of backing up the data object. Various other methods, systems, and computer-readable media are also disclosed.

16 Claims, 7 Drawing Sheets

SYSTEMS AND METHODS FOR PERFORMING BACKUPS

BACKGROUND

In the digital age, organizations increasingly rely on digitally-stored data. To protect against data loss, an organization may use a backup system to back up important data. In some situations, the organization may also use an archive system to preserve data or offload lesser used data to a more economical storage device.

Unfortunately, both backup systems and archive systems may consume significant amounts of computing resources. For instance, backups may consume storage space, and transferring data for backups may consume I/O bandwidth and network bandwidth. Additionally, the more data there is to backup, the longer backups may take to perform. Likewise, archiving files may consume network bandwidth and create latency when archived data is retrieved.

Traditional archiving technologies may reduce the costs of archive systems by leaving local copies of archived data in certain cases (e.g., for commonly accessed data) rather than removing the local copies immediately once the data has been archived. This may avoid the network bandwidth consumption and latency that may result from retrieving archived data. Unfortunately, this practice may exacerbate backup costs by leaving additional local data for a backup system to read, transmit, and store. Accordingly, the instant disclosure identifies and addresses a need for performing backups efficiently.

SUMMARY

As will be described in greater detail below, the instant disclosure generally relates to systems and methods for performing backups. Embodiments of the instant disclosure may perform backups of a data object (such as a file, a database entry, etc.) by locating an archived copy of the data object and backing up a reference to the archived copy instead of backing up the data object itself. For example, a method may include identifying a volume of data targeted for backup, identifying at least one data object within the volume of data, locating a copy of the data object within an archival data store, and backing up a reference to the copy of the data object within the archival data store instead of backing up the data object.

Identifying the data object may include determining a variety of information about the data object (e.g., in order to select the data object). For example, identifying the data object may include determining that the data object is to remain on the volume of data after being copied to the archival data store. In another example, identifying the data object may include determining that the data object is to be backed up as the reference to the copy of the data object in the archival data store. In some examples, identifying the data object may include determining that the data object was last modified after a predetermined point in time. Additionally or alternatively, identifying the data object may include determining that the data object includes a deleted object, a sent object, and/or an expired object.

Locating the copy of the data object within the archival store may occur in a variety of contexts. In some contexts, locating the copy of the data object within the archival store may include copying the data object to the archival store.

Backing up the reference to the copy of the data object may entail a variety of approaches. For example, backing up the reference to the copy of the data object may include leaving the data object intact on the volume of data. In another example, backing up the reference to the copy of the data object may include replacing a copy of the data object within a backup with the reference to the copy of the data object within the archival data store.

In some examples, the method may also include identifying a request to restore the data object from backup. In these examples, the method may further include restoring the reference to the copy of the data object within the archival data store to the volume of data.

In some examples, a system for performing backups may include an identification module, a locating module, and a backup module. The identification module may be programmed to identify a volume of data targeted for backup and to identify at least one data object within the volume of data. The locating module may be programmed to locate a copy of the data object within an archival data store. The backup module may be programmed to back up a reference to the copy of the data object within the archival data store instead of backing up the data object.

The identification module may be programmed to identify the data object by determining a variety of information about the data object (e.g., in order to select the data object). For example, the identification module may be programmed to identify the data object by determining that the data object is to remain on the volume of data after being copied to the archival data store. In another example, the identification module may be programmed to identify the data object by determining that the data object is to be backed up as the reference to the copy of the data object in the archival data store. In some examples, the identification module may be programmed to identify the data object by determining that the data object was last modified after a predetermined point in time. Additionally or alternatively, the identification module may be programmed to identify the data object by determining that the data object includes a deleted object, a sent object, and/or an expired object.

The locating module may be programmed to locate the copy of the data object within the archival store in a variety of contexts. In some contexts, the locating module may be programmed to locate the copy of the data object within the archival store by copying the data object to the archival store.

The backup module may back up the reference to the copy of the data object using one or more of a variety of approaches. For example, the backup module may back up the reference to the copy of the data object while leaving the data object intact on the volume of data. In another example, the backup module may back up the reference to the copy of the data object by replacing a copy of the data object within a backup with the reference to the copy of the data object within the archival data store.

In some examples, the system may also include a restoration module programmed to identify a request to restore the data object from backup. In these examples, the restoration module may be further programmed to restore the reference to the copy of the data object within the archival data store to the volume of data.

In some embodiments, a computer-readable-storage medium may include one or more computer-executable instructions that, when executed by at least one processor of a computing device, cause the computing device to identify a volume of data targeted for backup, identify at least one data object within the volume of data, locate a copy of the data object within an archival data store, and back up a reference to the copy of the data object within the archival data store instead of backing up the data object. In some examples, the computer-executable instructions may cause the computing device to leave the data object intact on the volume of data when backing up the reference to the copy of the data object.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
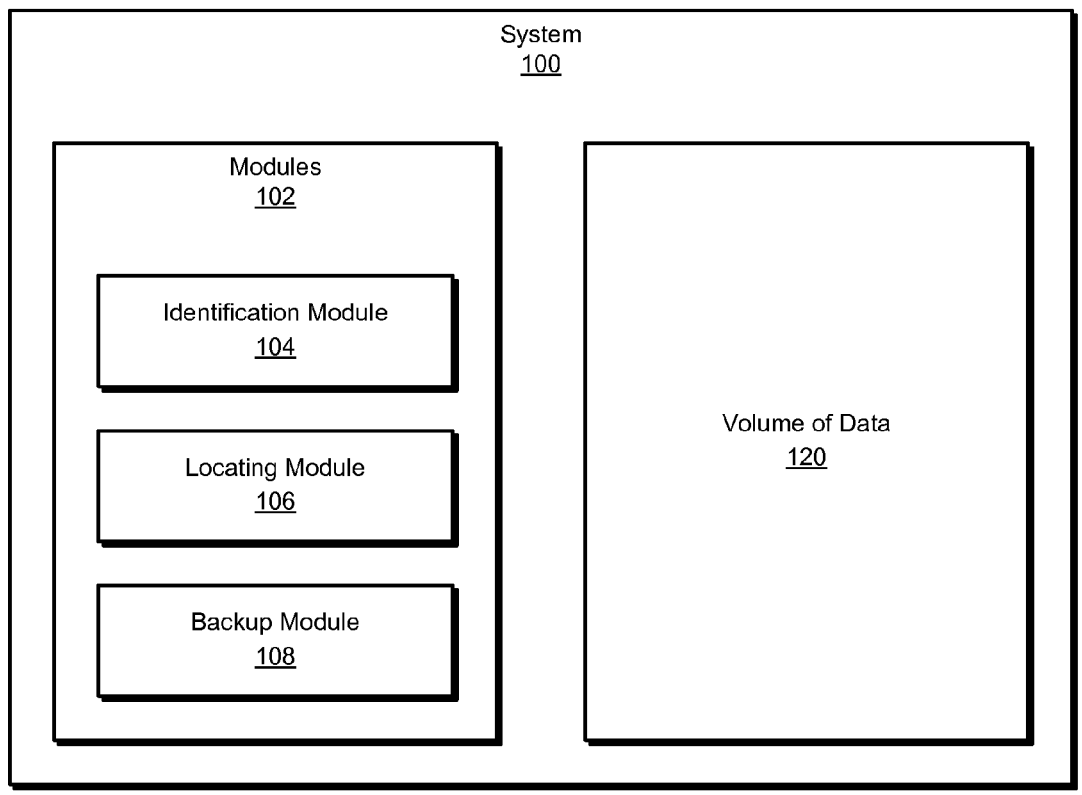
FIG. 1 is a block diagram of an exemplary system for performing backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for performing backups. Systems and methods described herein may perform backups of a data object (such as files, database entries, etc.) by locating an archived copy of the data object and backing up a reference to the archived copy instead of backing up the data object itself. By backing up the reference rather than backing up the data object, systems and methods described herein may reduce backup time (e.g., shortening backup windows), reduce backup storage consumption, reduce network bandwidth consumption, and/or reduce I/O bandwidth consumption.

Figure 2:
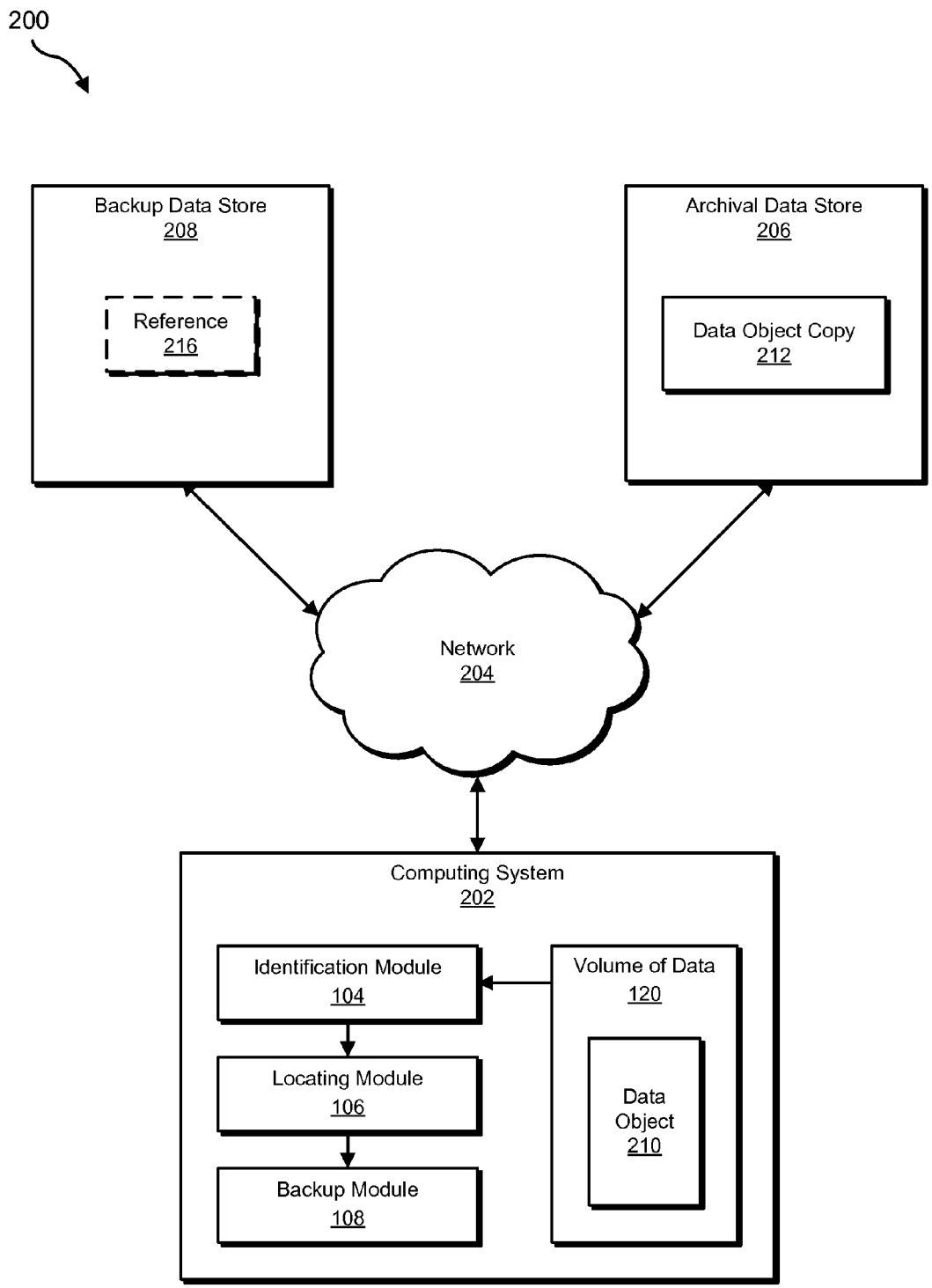
FIG. 2 is a block diagram of another exemplary system for performing backups.
Figure 4:
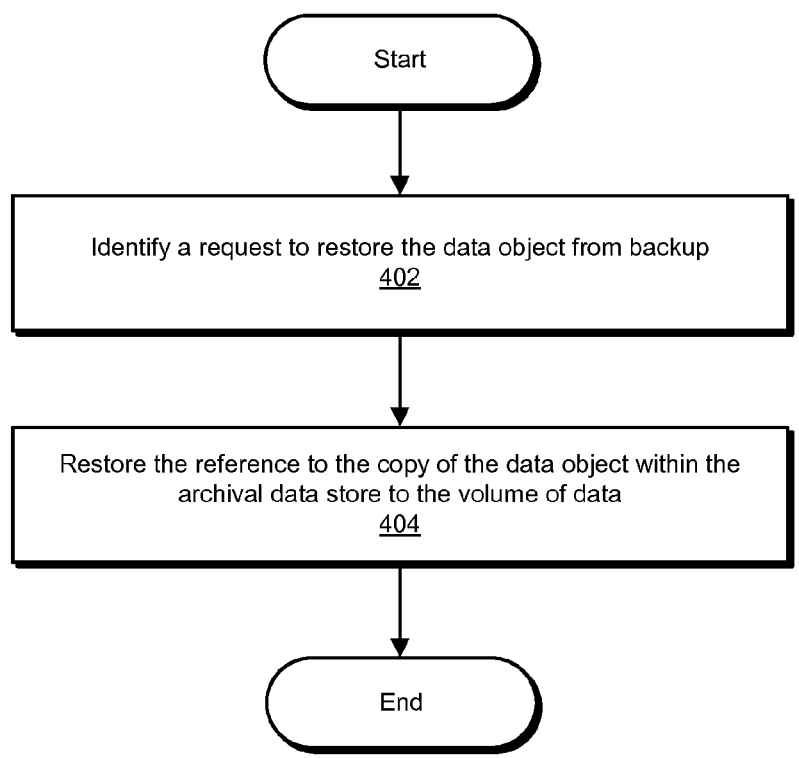
FIG. 4 is a flow diagram of another exemplary method for performing backups.
Figure 5:
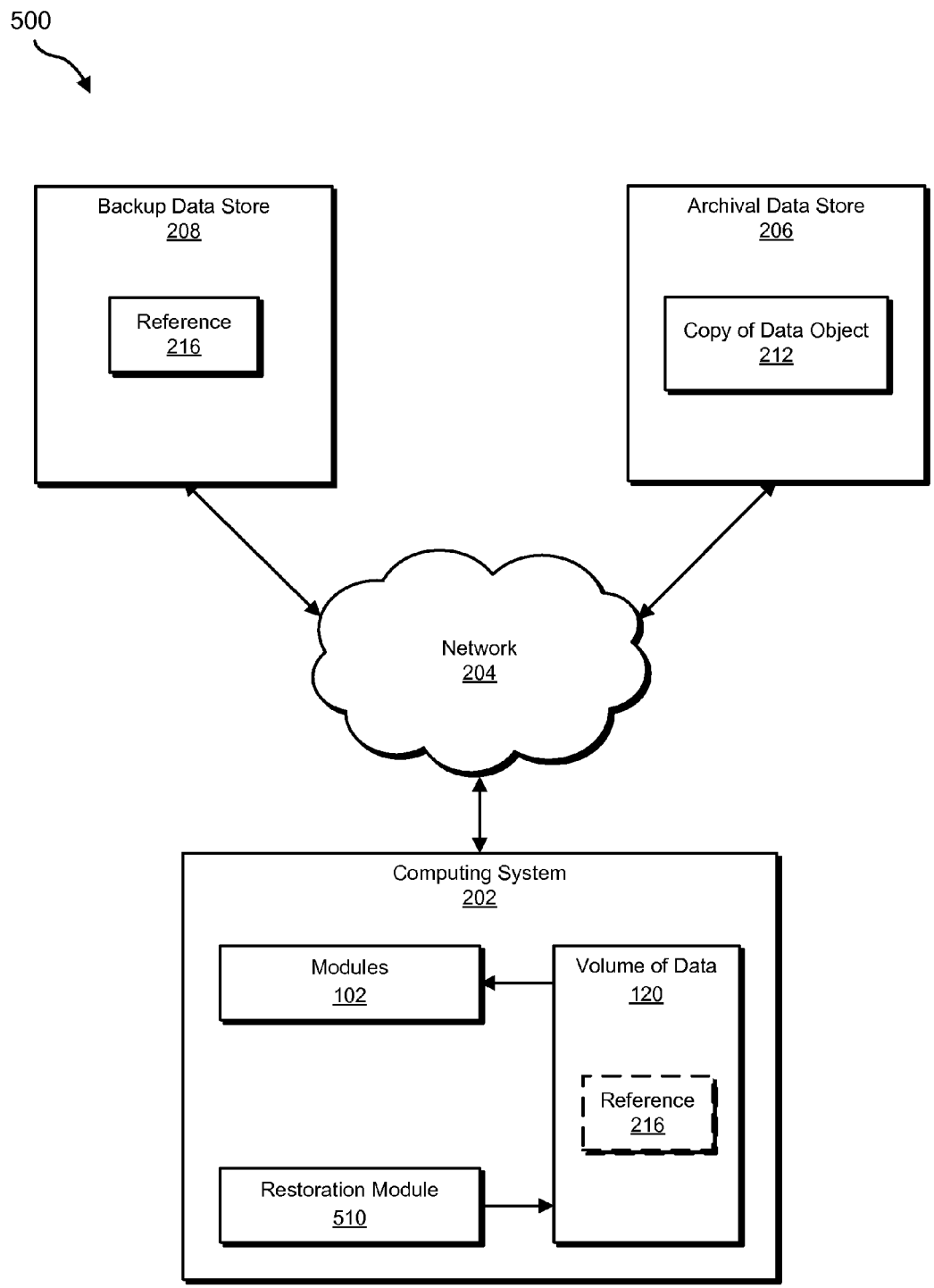
FIG. 5 is a block diagram of an exemplary system for performing backups.

The following will provide, with reference to FIGS. 1, 2, and 5, detailed descriptions of exemplary systems for performing backups. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for performing backups. As illustrated in this figure, exemplary system 100 may include one or more modules 102 for performing one or more tasks. For example, and as will be explained in greater detail below, exemplary system 100 may include an identification module 104 programmed to identify a volume of data targeted for backup and to identify at least one data object within the volume of data. Exemplary system 100 may also include a locating module 106 programmed to locate a copy of the data object within an archival data store.

In addition, and as will be described in greater detail below, exemplary system 100 may include a backup module 108 programmed to back up a reference to the copy of the data object within the archival data store instead of backing up the data object. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202, archival data store 206, and/or backup data store 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include a volume of data 120. Volume of data 120 may represent portions of a single database, volume, or storage device or a plurality of databases, volumes, or storage devices. For example, volume of data 120 may represent a portion of computing system 202 in FIG. 2, computing system 610 in FIG. 6, and/or portions of exemplary network architecture 700 in FIG. 7. Alternatively, volume of data 120 in FIG. 1 may represent a portion of one or more physically separate devices capable of being accessed by a computing device, such as computing system 610 in FIG. 6 and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 with access to an archival data store 206 and a backup data store 208 via a network 204. Computing system 202 may include volume of data 120, which may include a data object 210. Archival data store 206 may include data object copy 212 (e.g., a copy of data object 210). In one embodiment, and as will be described in greater detail below, computing system 202 may be programmed with identification module 104, locating module 106, and backup module 108 from FIG. 1.

Identification module 104 may identify volume 120 targeted for backup data store 208. Identification module 104 may also identify data object 210 within volume of data 120. Locating module 106 may be programmed to locate data object copy 212, a copy of data object 210, within archival data store 206. Backup module 108 may be programmed to back up reference 216 to data object copy 212 instead of backing up data object 210.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Archival data store 206 generally represents any type or form of volume, database, and/or collection of archived data. In some examples, archival data store 206 may be stored and/or facilitated by one or more computing devices such as storage arrays, backup servers, application servers, and/or database servers configured to provide backup various database services and/or run certain software applications. Though shown connected to computing system 202 via network 204, in some examples, computing system 202 may access archival data store 206 via a different mode of transmission (e.g., a direct-attached storage device).

Backup data store 208 generally represents any type or form of volume, database, and/or collection of backup data. In some examples, backup data store 208 may be stored and/or facilitated by one or more computing devices such as storage arrays, backup servers, application servers, and database servers configured to provide backup various database services and/or run certain software applications. Though shown connected to computing system 202 via network 204, in some examples, computing system 202 may access backup data store 208 via a different mode of transmission (e.g., via a direct-attached storage device).

Network 204 generally represents any medium or architecture capable of facilitating communication or data transfer. Examples of network 204 include, without limitation, an intranet, a wide area network (WAN), a local area network (LAN), a personal area network (PAN), a storage area network (SAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing system 202, archival data store 206, and/or backup data store 208.

Figure 3:
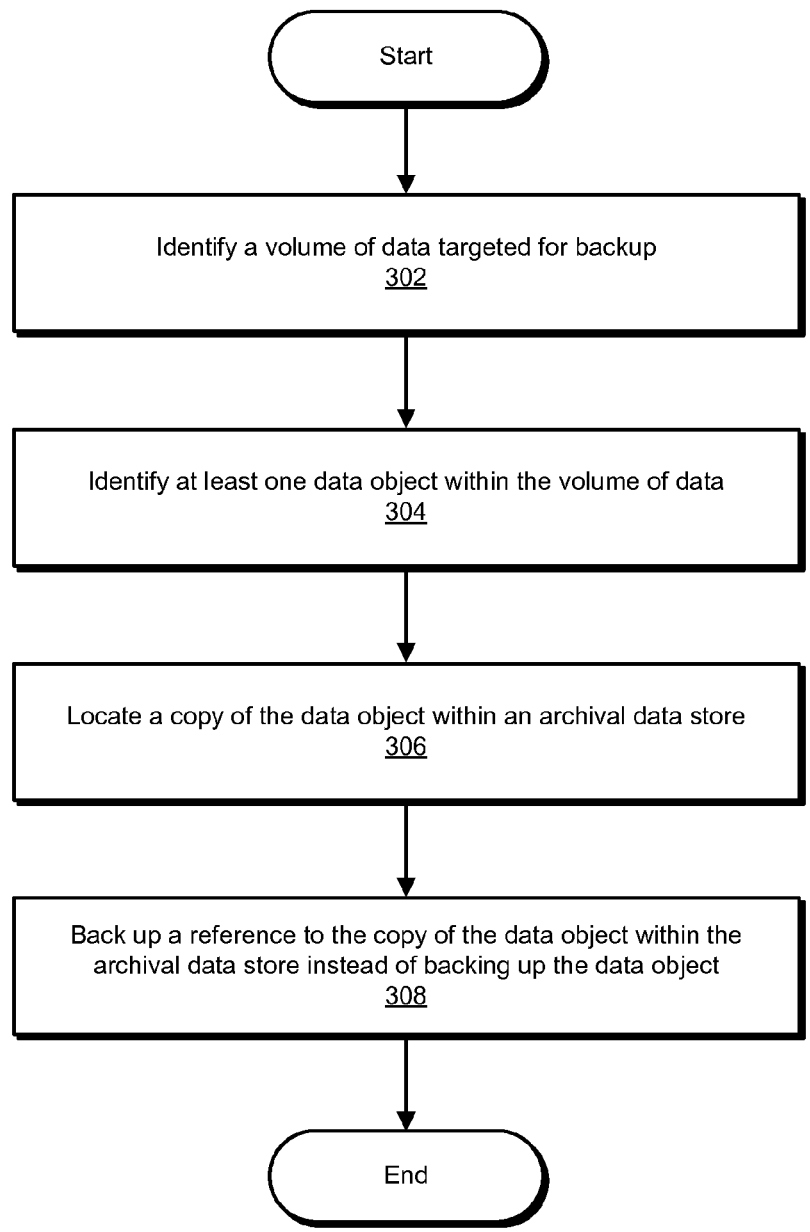
FIG. 3 is a flow diagram of an exemplary method for performing backups.

FIG. 3 is a flow diagram of an exemplary computer-implemented method 300 for performing backups. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a volume of data targeted for backup. For example, at step 302 identification module 104 may, as part of computing system 202, identify volume of data 120.

As used herein, the phrase "volume of data" may refer to any collection of data. Examples of a volume of data include, but are not limited to, a database, a file system partition, a logical volume, and/or a selected group of files. Additionally, as used herein the term "backup" may refer to any procedure to backup, duplicate, and/or protect data and/or the results of any such procedure.

Identification module 104 may identify the volume of data in any suitable manner. For example, identification module 104 may read a configuration file that identifies the volume of data. Additionally or alternatively, identification module 104 may receive a message that identifies the volume of data. In some examples, identification module 104 may include at least a portion of a backup system. In these examples, identification module 104 may identify the volume of data in the course of backing up the volume of data.

At step 304 one or more of the systems described herein may identify at least one data object within the volume of data. For example, at step 304 identification module 104 may, as part of computing system 202, identify data object 210 within volume of data 120.

As used herein, the phrase "data object" may refer to any form or type of data entity or digital information. Examples of data objects include, but are not limited to, files, file segments or other portions of files, database entries, emails, calendar entries. For example, data objects may include data components of such applications as MICROSOFT EXCHANGE, IBM LOTUS NOTES, MICROSOFT SHAREPOINT, etc. Generally, a "data object" may include to any unit of data which may be backed up.

Identification module 104 may identify the data object in a variety of ways. For example, identification module 104 may identify the data object by identifying a user-selected data object. For example, a user may select a group of data objects to back up with archival references rather than copies of the data objects. In some examples, the user may select specific data objects. Additionally or alternatively, the user may select attributes of data objects to be backed up with archival references.

In some additional examples, identification module 104 may identify the data object by following a default classification template and/or scheme that indicates that the data object is to be backed up using an archival reference rather than a copy of the data object. For example, a data protection vendor may supply a configuration file specifying (either directly or by attribute) the data object. In this example, identification module 104 may identify the data object by reading the configuration file.

In some further examples, identification module 104 may identify the data object by analyzing the data object to determine that the data object will be subject to backing up by archival reference. For example, identification module 104 may scan the data object and/or analyze portions of the data object and/or metadata relating to the data object to determine that the data object is likely to be archived.

Identification module 104 may use a variety of parameters in identifying the data object (e.g., determining that the data object may be subject to backing up by archival reference). In some examples, identification module 104 may, as a part of identifying the data object, determine that the data object is to remain on the volume of data after being copied to an archival data store. As will be explained in greater detail below, systems and methods described herein may locate a copy of the data object within the archival data store. For example, the data object may include data that is accessed frequently and/or likely to be accessed frequently. Since accessing the data object from the volume of data may more efficient and/or less resource-intensive that accessing the data object from the archival data store, identification module 104 may identify the data object for backup by archival reference. In some examples, identification module 104 may simply identify each data object in the archival data store which has not yet been stubbed on the volume of data (e.g., has not been replaced on the volume of data with a short-cut to the archival data store).

Additionally or alternatively, identification module 104 may identify the data object after determining that the data object was last modified after a predetermined point in time. For example, identification module 104 may identify the data object after determining that the data object was last modified within a predetermined number of days of the current time.

In some examples, identification module 104 may identify the data object after determining that the data object has already been exhausted, handled, and/or reviewed. For example, identification module 104 may identify the data object after determining that the data object includes a deleted object. For example, the data object may include a deleted email, a deleted calendar item, etc. In another example, identification module 104 may identify the data object after determining that the data object includes a sent object. For example, identification module 104 may identify the data object after determining that the data object includes a sent email. In an additional example, identification module 104 may identify the data object after determining that the data object includes an expired object. For example, the data object may include an expired calendar item.

In various examples, identification module 104 may identify the data object simply by determining that the data object is to be backed up as the reference to the copy of the data object in the archival data store. Identification module 104 may implement any of the steps described above, and/or any other suitable steps, in order to make the determination. For example, identification module 104 may receive, read from, and/or analyze configuration data to determine that the data object is to be backed up as the reference to the copy of the data object in the archival data store. Additionally or alternatively, identification module 104 may examine characteristics of the data object, the volume of data, and/or the archival data store (e.g., relative estimates of retrieval time from the volume of data and the archival data store, space available on the volume of data, etc.) to make the determination.

Returning to FIG. 3, at step 306 one or more of the systems described herein may locate a copy of the data object within an archival data store. For example, at step 306 locating module 106 may, as part of computing system 202, locate data object copy 212 within archival data store 206.

As used herein, the term "copy" may refer to any copy, reproduction, and/or full data representation. For example, a copy may be in the same format or a different format as the original, may be compressed or uncompressed, etc. As used herein, the phrase "archival data store" may refer to any storage system for archiving data. For example, the archival data store may include storage space allocated for archival purposes by an archival system, such as SYMANTEC ENTERPRISE VAULT.

Locating module 106 may locate the copy of the data object in any suitable manner. For example, locating module 106 may locate the copy of the data object by querying a database of the archival data store. In some examples, locating module 106 may batch multiple such queries together (e.g., for efficiency).

In some examples, locating module 106 may locate the copy of the data object in the archival data store when copying the data object to the archival data store. For example, a data object may be classified for backup by reference to an archival copy, and the data object may additionally be classified for archival. If the data object has not yet been archived, locating module 106 may copy the data object to the archival data store and accordingly locate the copy.

Returning to FIG. 3, at step 308 one or more of the systems described herein may back up a reference to the copy of the data object within the archival data store instead of backing up the data object. For example, at step 308 backup module 108 may, as part of computing system 202, back up reference 216 to data object copy 212 instead of backing up data object 210.

As used herein, the term "reference" may refer to any suitable indicator and/or mechanism for associating a data object with an archival data store. For example, a reference may refer to a stub (e.g., a virtual data object that, when accessed, may trigger a retrieval of a corresponding data object from an archival data store), a short-cut, a link, an address, a path, or any other suitable means of reference. The reference may include data already existing on the volume of data and/or data created for the purpose of backing up the reference.

Backup module 108 may back up the reference to the copy of the data object using one or more of a variety of approaches. For example, backup module 108 may leave the data object intact on the volume of data when backing up the reference to the copy of the data object (e.g., instead of replacing the data object on the volume of data with a stub or other means of reference). In this manner the data object may be available for efficient access on the volume of data while still meeting archival requirements and without unnecessarily burdening the backup process.

In some examples, backup module 108 may back up the reference to the copy of the data object by replacing a copy of the data object within a backup with the reference to the copy of the data object within the archival data store. For example, if the data object has already been backed up, backup module 108 may save storage space and/or later processing requirements by replacing the backed up data object with the reference to the copy of the data object. After step 308, method 300 may terminate.

FIG. 4 is a flow diagram of an exemplary computer-implemented method 400 for performing backups. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

At step 402 one or more of the systems described herein may identify a request to restore the data object from backup. For example, FIG. 5 illustrates an exemplary system 500 for performing backups and includes backup data store 208, archival data store 206, computing system 202, and a network 204. FIG. 5 shows computing system 202 configured with a restoration module 510. Restoration module 510 in FIG. 5 may accordingly identify a request to restore a data object (e.g., data object 210 from FIG. 2) from backup data store 208.

Restoration module 510 may perform step 402 in any suitable manner. For example, restoration module 510 may receive a message from a backup system to restore the data object. Additionally or alternatively, restoration module 510 may intercept a message to a backup system or from the backup system to restore the data object.

At step 404 one or more of the systems described herein may restore the reference to the copy of the data object within the archival data store to the volume of data. For example, restoration module 510 may, as part of computing system 202 in FIG. 5, restore reference 216 to copy of data object 212 from archival data store 206 to volume of data 120.

Restoration module 510 may perform step 404 in any suitable manner. For example, restoration module 510 may restore the reference to the copy of the data object to the volume of data by copying the reference to the volume of data. In some examples, restoration module 510 may restore the reference to the volume of data by creating a stub on the volume of data that refers to the copy of the data object within the archival data store.

By backing up a reference to a data object within an archival data store rather than backing up the data object, systems and methods described herein may reduce backup time (e.g., shortening backup windows), reduce backup storage consumption, reduce network bandwidth consumption, and/or reduce I/O bandwidth consumption. The systems and methods described herein may be implemented within a variety of deployments. For example, the systems and methods described herein may operate in deployments with separate data protection and data archival systems (e.g., SYMANTEC NETBACKUP and SYMANTEC ENTERPRISE VAULT) and/or in deployments with unified data protection and data archival systems (e.g., COMMVAULT or SYMANTEC BACKUPEXEC with SYMANTEC BACKUPEXEC ARCHIVE OPTION).

Figure 6:
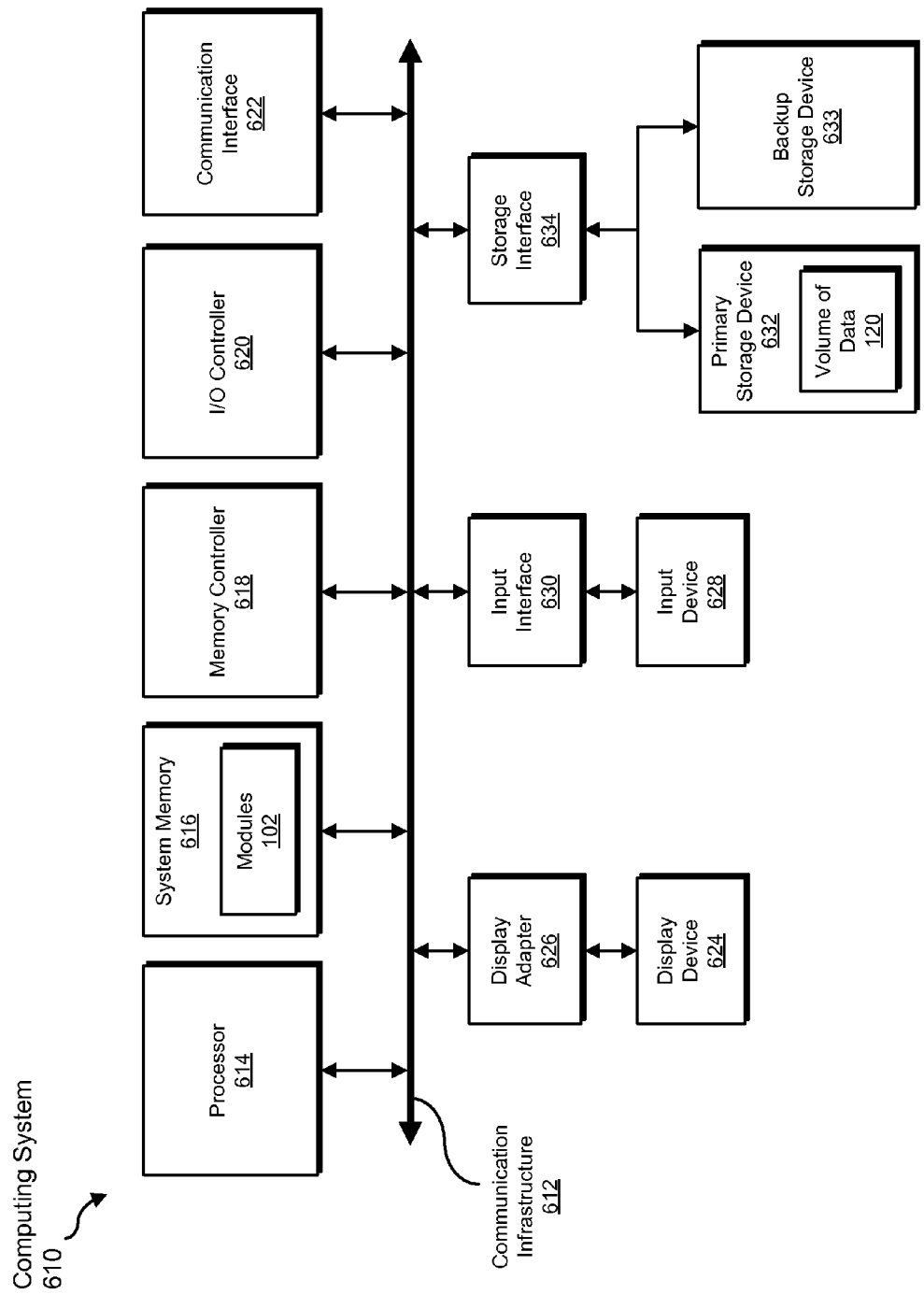
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, locating, copying, backing up, leaving, replacing, and/or restoring steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, determining, locating, copying, backing up, leaving, replacing, and/or restoring.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, determining, locating, copying, backing up, leaving, replacing, and/or restoring steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, locating, copying, backing up, leaving, replacing, and/or restoring steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, locating, copying, backing up, leaving, replacing, and/or restoring steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, volume of data 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, determining, locating, copying, backing up, leaving, replacing, and/or restoring steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
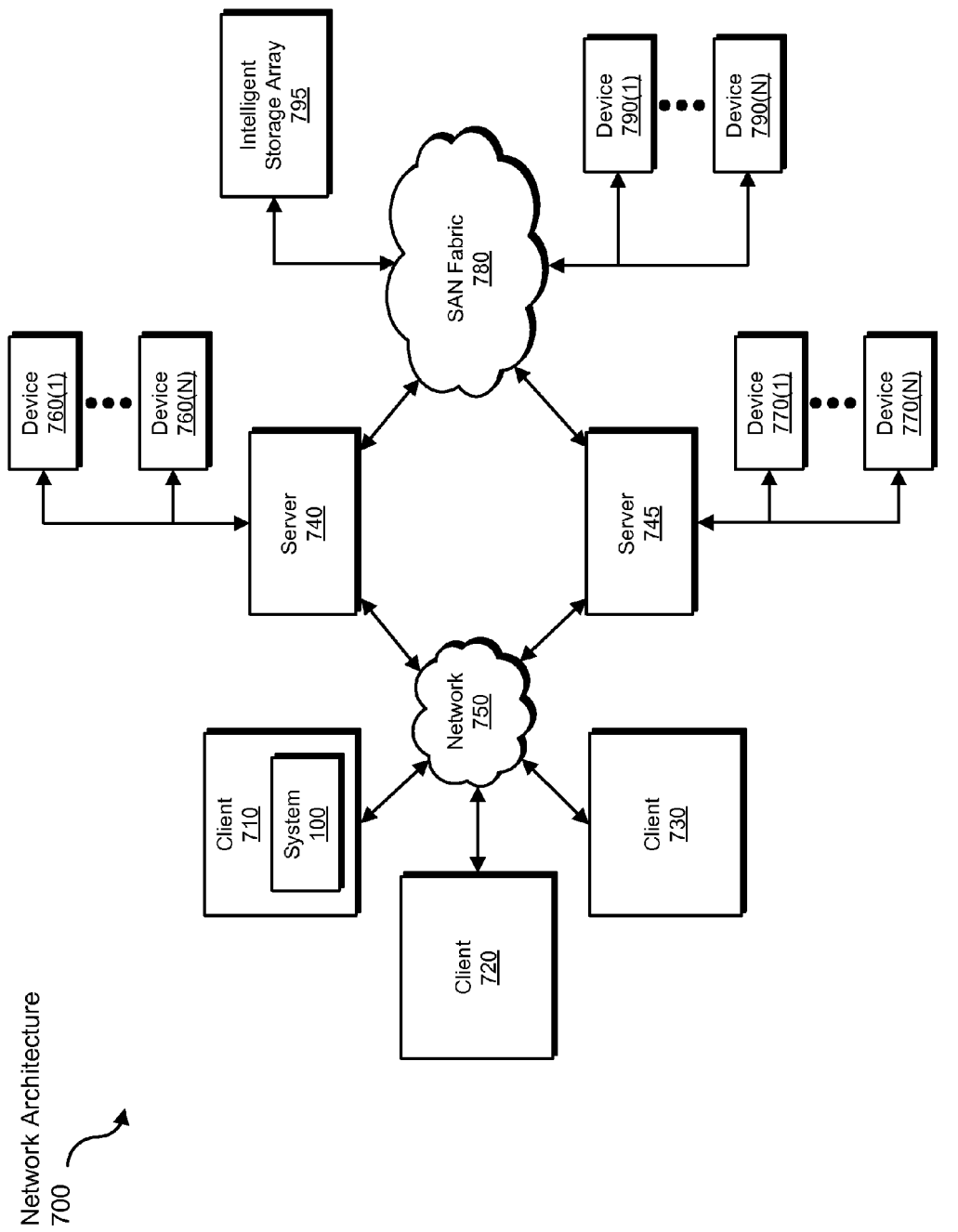
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, locating, copying, backing up, leaving, replacing, and/or restoring steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for performing backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a backup system into a system that backs up references to copies of data instead of backing up the data itself.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing backups, at least a portion of the method being performed by a computing device comprising at least one processor, the method comprising:

identifying a volume of data targeted for backup to a backup data store;

reading configuration data that identifies a characteristic of data objects that are to be backed up using archival-reference objects;

identifying at least one data object within the volume of data that is to be backed up using an archival-reference object by examining characteristics of one or more data objects in the volume of data and identifying the at least one data object having the characteristic identified in the configuration data;

querying an archival data store, that is distinct and independent from the backup data store, to locate a copy of the at least one data object that is already within the archival data store;

backing up, to the backup data store and in response to locating the copy of the at least one data object within the archival data store, the archival-reference object that points to a location of the copy of the at least one data object within the archival data store instead of backing up the at least one data object to the backup data store, wherein the archival-reference object is backed up to the backup data store after the at least one data object has been archived to the archival data store but before the at least one data object has been replaced within the volume of data by the archival-reference object.

2. The computer-implemented method of claim 1, wherein the backing up the archival-reference object comprises leaving the at least one data object intact on the volume of data targeted for backup.

3. The computer-implemented method of claim 1, wherein the identifying the at least one data object comprises receiving a user selection of the characteristic of data objects that are to be backed up using archival-reference objects.

4. The computer-implemented method of claim 1, wherein the identifying the at least one data object comprises analyzing the at least one data object by scanning the at least one data object to determine that the at least one data object is to be backed up using the archival-reference object.

5. The computer-implemented method of claim 1, wherein:
the characteristic identified in the configuration data comprises a predetermined point in time for most recent modification of data objects;
the identifying the at least one data object comprises determining that the at least one data object was last modified after the predetermined point in time.

6. The computer-implemented method of claim 1, wherein the backing up the archival-reference object comprises replacing a copy of the at least one data object within a backup with the archival-reference object.

7. The computer-implemented method of claim 1, further comprising:
identifying a request to restore the at least one data object from backup;
restoring the archival-reference object to the volume of data targeted for backup instead of restoring the copy of the at least one data object.

8. A system for performing backups, the system comprising:
an identification module programmed to:
identify a volume of data targeted for backup to a backup data store;
read configuration data that identifies a characteristic of data objects that are to be backed up using archival-reference objects;
identify at least one data object within the volume of data that is to be backed up using an archival-reference object by examining characteristics of one or more data objects in the volume of data and identifying the at least one data object having the characteristic identified in the configuration data;
a locating module programmed to query an archival data store, that is distinct and independent from the backup data store, to locate a copy of the at least one data object that is already within the archival data store;
a backup module programmed to back up, to the backup data store and in response to locating the copy of the at least one data object within the archival data store, the archival-reference object that points to a location of the copy of the at least one data object within the archival data store instead of backing up the at least one data object to the backup data store, wherein the archival-reference object is backed up to the backup data store after the at least one data object has been archived to the archival data store but before the at least one data object has been replaced within the volume of data by the archival-reference object;
at least one computer processor configured to execute the identification module, the locating module, and the backup module.

9. The system of claim 8, wherein the backup module is programmed to back up the archival-reference object to reduce backup storage consumption and backup network bandwidth consumption.

10. The system of claim 8, wherein the identification module is programmed to identify the at least one data object by:
receiving, from a data protection vendor, the configuration data as a configuration file specifying the at least one data object;
reading the configuration file to identify the at least one data object.

11. The system of claim 8, wherein the identification module is further programmed to receive the configuration data from a user.

12. The system of claim 11, wherein the identification module is programmed to receive the configuration data from the user by receiving, from the user, a selection of the characteristic of data objects that are to be backed up using the archival-reference objects.

13. The system of claim 8, wherein the identification module is programmed to identify the at least one data object by analyzing metadata of the at least one data object to determine that the at least one data object is to be backed up using the archival-reference object.

14. The system of claim 8, wherein the backup module operates as part of a deployment that comprises unified data protection and data archival systems for backing up and archiving data objects.

15. A non-transitory computer-readable-storage medium comprising one or more computer-executable instructions that, when executed by at least one processor of a computing device, cause the computing device to:
identify a volume of data targeted for backup to a backup data store;
read configuration data that identifies a characteristic of data objects that are to be backed up using archival-reference objects;
identify at least one data object within the volume of data that is to be backed up using an archival-reference object by examining characteristics of one or more data objects in the volume of data and identifying the at least one data object having the characteristic identified in the configuration data;
query an archival data store, that is distinct and independent from the backup data store, to locate a copy of the at least one data object that is already within the archival data store;
back up, to the backup data store and in response to locating the copy of the at least one data object within the archival data store, the archival-reference object that points to a location of the copy of the at least one data object within the archival data store instead of backing up the at least one data object to the backup data store, wherein the archival-reference object is backed up to the backup data store after the at least one data object has been archived to the archival data store but before the at least one data object has been replaced within the volume of data by the archival-reference object.

16. The non-transitory computer-readable-storage medium of claim 15, wherein the backing up the archival-reference object comprises leaving the at least one data object intact on the volume of data.

* * * * *

UNITED STATES PATENT AND TRADEMARK OFFICE
CERTIFICATE OF CORRECTION

| | |
|---|---|
| PATENT NO. | : 8,694,468 B1 |
| APPLICATION NO. | : 12/796829 |
| DATED | : April 8, 2014 |
| INVENTOR(S) | : Kuldeep Nagarkar et al. |

It is certified that error appears in the above-identified patent and that said Letters Patent is hereby corrected as shown below:

In the Claims:

Claim 12, at column 16, lines 18 to 22, should read:

The system of claim 11, wherein the identification module is programmed to receive the configuration data from the user by receiving, from the user, a selection of the characteristic of data objects that are to be backed up using archival-reference objects.

Signed and Sealed this
Ninth Day of September, 2014

Michelle K. Lee
*Deputy Director of the United States Patent and Trademark Office*